DRAFTSMAN.
144. WOOD-WORKING,
153 Work Guides.
E. M. Smith,
Wood Plane Attachment.
No. 287. A. I. Patented June 26, 1860.
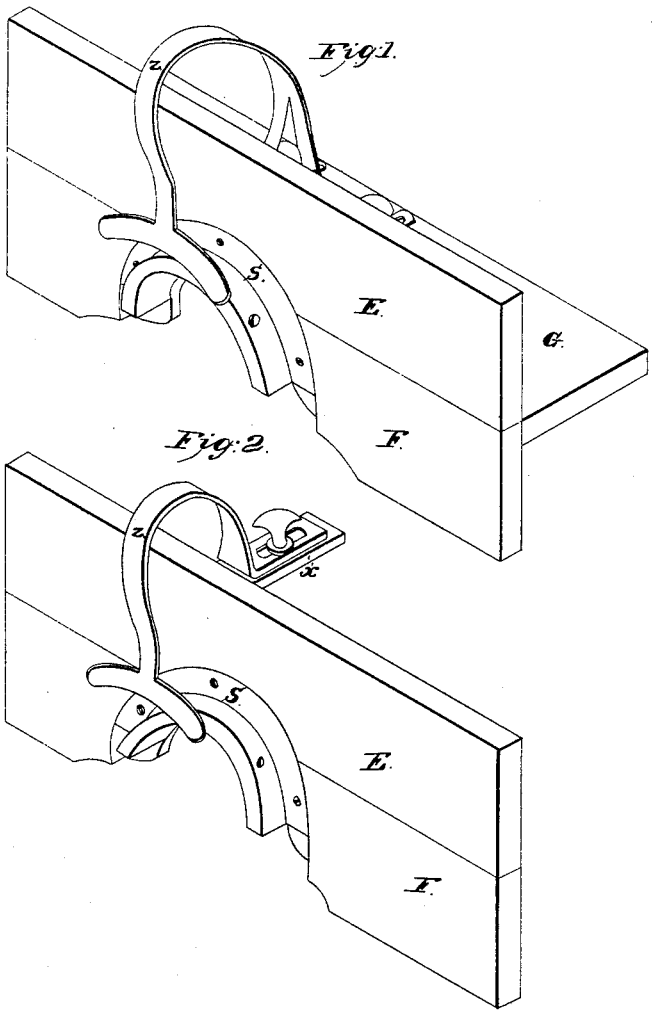
Witnesses:
C. F. Mayhew.
H. J. Gothing.
Inventor:
Elisha M. Smith.
A.M. PHOTO-LITHO. CO. N.Y. (OSBORNE'S PROCESS)